US 12,088,154 B2

(12) United States Patent
Miyamoto

(10) Patent No.: US 12,088,154 B2
(45) Date of Patent: Sep. 10, 2024

(54) COOLING CONTROL DEVICE, ELECTRIC SYSTEM, AND COOLING CONTROL METHOD

(71) Applicant: HITACHI ASTEMO, LTD., Hitachinaka (JP)

(72) Inventor: Shogo Miyamoto, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 94 days.

(21) Appl. No.: 17/779,336

(22) PCT Filed: Dec. 4, 2020

(86) PCT No.: PCT/JP2020/045177
§ 371 (c)(1),
(2) Date: May 24, 2022

(87) PCT Pub. No.: WO2021/131598
PCT Pub. Date: Jul. 1, 2021

(65) Prior Publication Data
US 2022/0407388 A1 Dec. 22, 2022

(30) Foreign Application Priority Data
Dec. 26, 2019 (JP) .................................. 2019-236351

(51) Int. Cl.
*H02K 11/33* (2016.01)
*H02K 9/19* (2006.01)
*H02P 29/60* (2016.01)

(52) U.S. Cl.
CPC .............. *H02K 11/33* (2016.01); *H02K 9/19* (2013.01); *H02P 29/60* (2016.02)

(58) Field of Classification Search
CPC ............ H02K 11/33; H02K 9/19; H02P 29/60
See application file for complete search history.

(56) References Cited

U.S. PATENT DOCUMENTS

2018/0115224 A1 4/2018 Yamashita
2022/0077810 A1* 3/2022 Povlovitsch Seixas .....................
B60L 3/0061

FOREIGN PATENT DOCUMENTS

JP 2006-174562 A 6/2006
JP 2010-151282 A 7/2010
(Continued)

OTHER PUBLICATIONS

Translation of JP2010151282 has been attached.*
(Continued)

*Primary Examiner* — Zoheb S Imtiaz
(74) *Attorney, Agent, or Firm* — Volpe Koenig

(57) ABSTRACT

A control device that controls cooling of a rotating electrical machine for driving a vehicle includes an arithmetic operation unit that executes predetermined arithmetic operation processing, and a storage unit that is accessible by the arithmetic operation unit. First temperature information from a first temperature detection unit that detects a temperature of a first refrigerant that exchanges heat with at the rotating electrical machine, second temperature information from a second temperature detection unit that detects a temperature of a second refrigerant that exchanges heat with a winding of the rotating electrical machine and is cooled by the first refrigerant, third temperature information from a rotating electrical machine temperature detection unit detects a temperature of the rotating electrical machine, and fourth temperature information from an outside air temperature detection unit are input. The second temperature information is verified by using the first, second, third, and fourth temperature information.

9 Claims, 3 Drawing Sheets

(56) References Cited

FOREIGN PATENT DOCUMENTS

| | | | |
|---|---|---|---|
| JP | 2010151282 | * | 7/2010 |
| JP | 2016-185050 A | | 10/2016 |
| JP | 201618505 | * | 10/2016 |
| JP | 2016-192832 A | | 11/2016 |

OTHER PUBLICATIONS

Translation of JP201618505 has been attached.*
International Search Report for PCT/JP2020/045177 mailed Mar. 23, 2021. 4 pages.

* cited by examiner

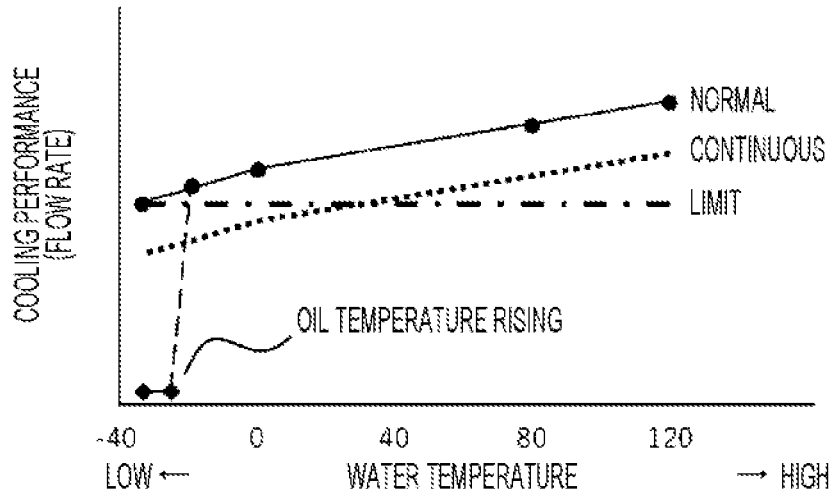

*FIG. 3*

NORMAL MODE: NORMAL TIME, ABNORMALITY OF OIL TEMPERATURE SENSOR
CONTINUOUS MODE: ABNORMALITY OF COIL TEMPERATURE SENSOR
LIMIT MODE: ABNORMALITY OF WATER TEMPERATURE SENSOR
OIL TEMPERATURE RISING MODE: TIME WHEN OIL TEMPERATURE IS EXTREMELY LOW

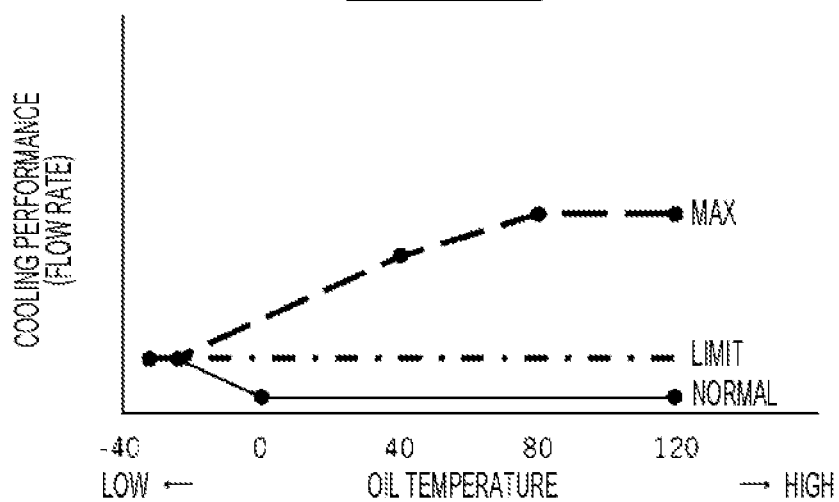

*FIG. 4*

MAX MODE: MAXIMUM COOLING REQUEST
LIMIT MODE: ABNORMALITY OF OIL TEMPERATURE SENSOR
NORMAL MODE: NORMAL TIME (WATER COOLING MAIN)

COOLING CONTROL DEVICE, ELECTRIC SYSTEM, AND COOLING CONTROL METHOD

TECHNICAL FIELD

The present invention relates to a cooling control device, and relates to a technique for controlling a cooling device of a rotating electrical machine for an electric vehicle.

BACKGROUND ART

In a so-called electric vehicle driven by a rotating electrical machine, it is necessary to cool heat generated by the rotating electrical machine. In a cooling device of the rotating electrical machine, water cooling in which an electric water pump supplies cooling water to a water jacket and oil cooling in which an electric oil pump supplies lubricating oil to an oil passage are integrated, and the cooling water cools the lubricating oil.

Background art of the present technical field includes the following prior art. PTL 1 (JP 2006-174562 A) discloses a vehicle driving device including an electric motor, lubricating oil cooling means that is installed outside the electric motor and cools lubricating oil in the electric motor with cooling water, cooling water circulating means for circulating the cooling water between cooling water cooling means for cooling the cooling water, and the electric motor and the lubricating oil cooling means via a cooling water pipe, and lubricating oil circulating means for circulating the lubricating oil between lubricating oil cooling means and the electric motor via a lubricating oil pipe (see Abstract).

Further, PTL 2 (JP 2010-151282 A) discloses an abnormality determination device for a hydraulic oil temperature sensor, which includes abnormality determination means for determining an abnormality of a hydraulic oil temperature sensor that detects a hydraulic oil temperature of a transmission connected to an internal combustion engine of a vehicle. The abnormality determination device includes a cooling water temperature sensor that detects a cooling water temperature of the internal combustion engine. The abnormality determination means compares the cooling water temperature detected by the cooling water temperature sensor with the hydraulic oil temperature detected by the hydraulic oil temperature sensor when the internal combustion engine starts after a predetermined time has elapsed from stop of the internal combustion engine. When a difference between the cooling water temperature and the hydraulic oil temperature is equal to or larger than a threshold value, the abnormality determination means determines that the hydraulic oil temperature sensor has abnormality (see claim 1).

CITATION LIST

Patent Literature

PTL 1: JP 2006-174562 A
PTL 2: JP 2010-151282 A

SUMMARY OF INVENTION

Technical Problem

PTL 1 described above discloses the configuration of the cooling means, but does not consider the operation when a refrigerant temperature (oil temperature) is erroneously recognized. Further, the device disclosed in PTL 2 determines an abnormality from the difference between the water temperature and the oil temperature, but may erroneously determine the abnormality due to other factors (for example, motor temperature, water temperature, outside air temperature, and the like).

In particular, in a drive system in which a motor and an inverter are housed in one case, an output value of an oil temperature sensor installed in a motor or a gear box may change due to noise emitted from an inverter. If the cooling performance of an electric component such as the motor or the inverter is erroneously decreased due to such erroneous recognition of the oil temperature, the electric component may be overheated or operate abnormally to be damaged.

Therefore, it is desired to accurately determine whether the measured oil temperature value is normal.

Solution to Problem

A representative example of the invention disclosed in this application is as follows. That is, there is provided a control device that controls cooling of a rotating electrical machine for driving a vehicle. The control device includes an arithmetic operation unit that executes predetermined arithmetic operation processing, and a storage unit that is accessible by the arithmetic operation unit. First temperature information obtained by a first temperature detection unit that detects a temperature of a first refrigerant that exchanges heat with at least the rotating electrical machine, second temperature information obtained by a second temperature detection unit that detects a temperature of a second refrigerant that exchanges heat with at least a winding of the rotating electrical machine and is cooled by the first refrigerant, third temperature information obtained by a rotating electrical machine temperature detection unit that detects a temperature of the rotating electrical machine, and fourth temperature information obtained by an outside air temperature detection unit that detects a temperature of an outside air are input. The second temperature information is verified by using the first temperature information, the second temperature information, the third temperature information, and the fourth temperature information.

Advantageous Effects of Invention

According to the present invention, it is possible to avoid erroneous recognition of an oil temperature and appropriately control the cooling performance of an electric component. Objects, configurations, and effects other than those described above will be clarified by the descriptions of the following embodiments.

BRIEF DESCRIPTION OF DRAWINGS

FIG. 3 is a diagram illustrating an operation of a water pump controlled by the cooling control device according to the embodiment of the present invention.

FIG. 4 is a diagram illustrating an operation of an oil pump controlled by the cooling control device according to the embodiment of the present invention.

DESCRIPTION OF EMBODIMENTS

A rotating electrical machine of which cooling is controlled by a cooling control device according to an embodiment is a rotating electrical machine suitable for use in traveling of a vehicle. A so-called electric vehicle using a rotating electrical machine includes a hybrid type electric vehicle (HEV) including both an engine and a rotating electrical machine and a pure electric vehicle (EV) that travels only with a rotating electrical machine without using an engine. The rotating electrical machine described below can be used for both types of vehicles.

Figure 1:
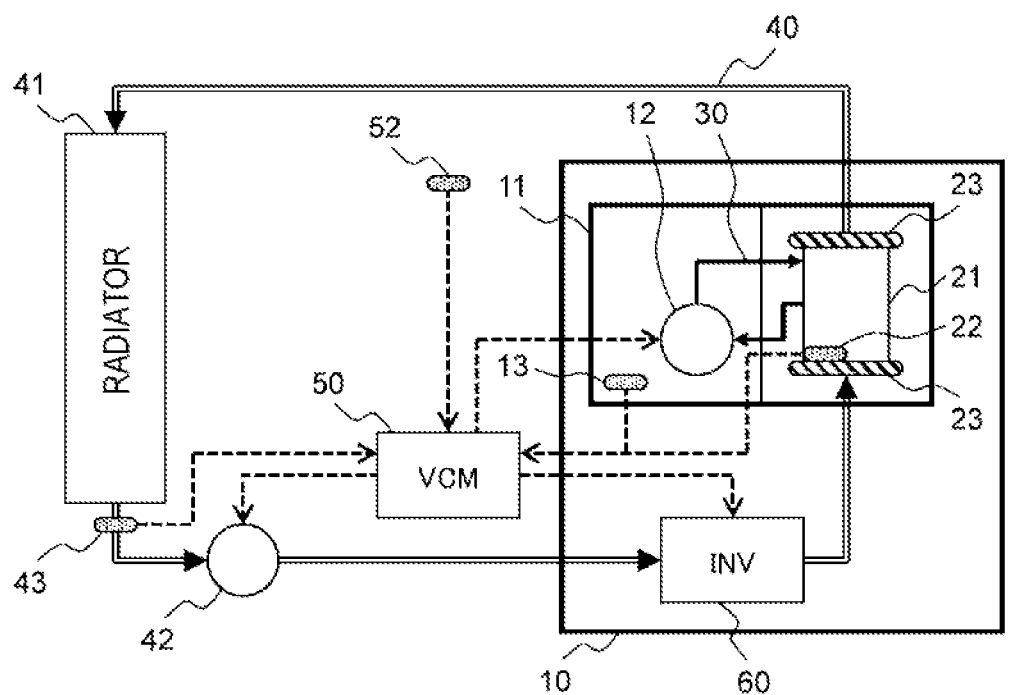
FIG. 1 is a block diagram illustrating a cooling device controlled by a cooling control device according to an embodiment of the present invention.

FIG. 1 is a block diagram illustrating a cooling device controlled by a cooling control device according to an embodiment of the present invention and a drive system cooled by the cooling device.

The drive system illustrated in FIG. 1 includes a rotating electrical machine 21, an inverter 60 that controls driving of the rotating electrical machine 21, a radiator 41, and a control device 50.

The rotating electrical machine 21 is housed in a gear box 11 together with a gear assembly connected to a shaft of the rotating electrical machine 21.

Although the structure in the rotating electrical machine 21 is not illustrated, a rotor is disposed on the inner peripheral side of a stator around which a winding is wound. The type of the rotating electrical machine 21 may be a permanent magnet electric motor having a permanent magnet, a synchronous electric motor having a field winding, an induction electric motor having a squirrel cage conductor, a reluctance rotating electrical machine formed of only a rotor core, or the like. Components for generating a magnetic field from a rotor and the shape thereof are not limited. The winding is configured in a distributed winding or concentrated winding manner. The winding may be configured by either a corner wire or a round wire, and a winding method and a type of the winding are not limited.

The rotating electrical machine 21 generates a rotating magnetic field in a manner that a current flows through the winding by a current and a voltage output from the inverter 60, and rotates a rotor to generate torque. The rotor is connected to the gear assembly through the shaft, and reduces the rotational speed of the rotating electrical machine 21 and drives the vehicle by connection of a gear output shaft inside the gear assembly to an axle. In addition, the rotating electrical machine 21 may not be used for traveling to convert electric energy into kinetic energy of the vehicle, but may be used for regeneration to generate electric energy from kinetic energy of the vehicle, or may be used for both traveling and regeneration.

Heat generated in the windings by the current is cooled by a medium such as water and lubricating oil. A temperature sensor 22 is provided inside the rotating electrical machine 21. The temperature sensor 22 measures the temperature of the rotating electrical machine 21 (for example, the winding), and outputs the measured winding temperature to the control device 50 and the inverter 60. The control device 50 changes the cooling amount of a motor in accordance with the winding temperature. If it is detected that the winding temperature is higher than a predetermined threshold value, the inverter 60 performs control to reduce the current flowing through the winding and suppress an increase in the temperature of the rotating electrical machine 21.

Lubricating oil stays inside the gear box 11, and a lubricating oil pipe 30 is provided so that the lubricating oil communicates between the rotating electrical machine 21 and the gear assembly. The lubricating oil circulates in the rotating electrical machine 21 by an oil pump 12 provided in the lubricating oil pipe 30, and lubricates and cools a gear and the rotating electrical machine 21. A temperature sensor 13 is provided inside the gear box 11. The temperature sensor 13 measures the temperature of the lubricating oil and outputs the measured oil temperature to the control device 50.

A water passage 23 through which cooling water passes is provided on the outer periphery (for example, inside a frame) of the rotating electrical machine 21. The water passage 23 is preferably formed in a spiral or folded shape to improve cooling efficiency of the rotating electrical machine 21. The water passage 23 is connected to the radiator 41 via a cooling water pipe 40. The cooling water having the increased temperature by cooling the rotating electrical machine 21 circulates in the cooling water pipe 40 by a water pump 42 provided in the cooling water pipe 40, is cooled by the radiator 41, and is brought back to the rotating electrical machine 21. The windings of the rotating electrical machine 21 can be cooled through the frame and the core of the stator by the cooling water flowing through the water passage 23. In addition, the lubricating oil can be cooled by cooling the entire frame, and the windings, bearings, and the like can also be cooled.

As illustrated, the cooling water pipe 40 may pass through the inverter 60 to cool the inverter 60. In addition, a valve may be provided in the cooling water pipe 40 to adjust the flow rate of the cooling water.

A temperature sensor 43 is provided in the cooling water pipe 40. The temperature sensor 43 measures the temperature of the cooling water and outputs the measured water temperature to the control device 50. The temperature sensor 43 may be provided in the cooling water pipe 40 near the outlet of the radiator 41 in order to measure the temperature of the cooling water having a low temperature.

A temperature sensor 52 is provided outside the drive system. The temperature sensor 52 measures an outside air temperature and outputs the measured outside air temperature to the control device 50.

The control device (vehicle control module) 50 includes the cooling control device, and controls operations (for example, running or stopping, flow rate of the medium) of the oil pump 12 and the water pump 42 based on measurement results of the various temperature sensors 13, 43, and 52.

The control device 50 is configured by a computer (microcomputer) including an arithmetic operation device, a memory, and an input/output device. The control device 50 may be provided separately from the inverter 60 or may be provided integrally with the inverter 60.

The arithmetic operation device includes a processor and executes a program stored in the memory. A portion of the processing performed by the arithmetic operation device executing the program may be executed by another arithmetic operation device (for example, hardware such as a field programmable gate array (FPGA) and an application specific integrated circuit (ASIC)).

The memory includes a ROM and a RAM which are non-volatile storage elements. The ROM stores an invariable program (for example, BIOS) and the like. The RAM includes a high-speed and volatile storage element such as a dynamic random access memory (DRAM) and a non-volatile storage element such as a static random access memory (SRAM). The RAM stores a program executed by the arithmetic operation device and data used when the program is executed. The program executed by the arithmetic operation device is stored in a non-volatile storage device being a non-transitory storage medium of the control device 50.

The input/output device is an interface that transmits processing contents to the outside or receives data from the outside, in accordance with a predetermined protocol.

The inverter 60 includes a switching element such as an insulated gate bipolar transistor (IGBT) or a silicon carbide (SiC), and drives the rotating electrical machine 21 by controlling the voltage and the current flowing through the windings of the rotating electrical machine 21. The inverter 60, the rotating electrical machine 21, and the gear assembly are disposed in one case 10.

Figure 2:
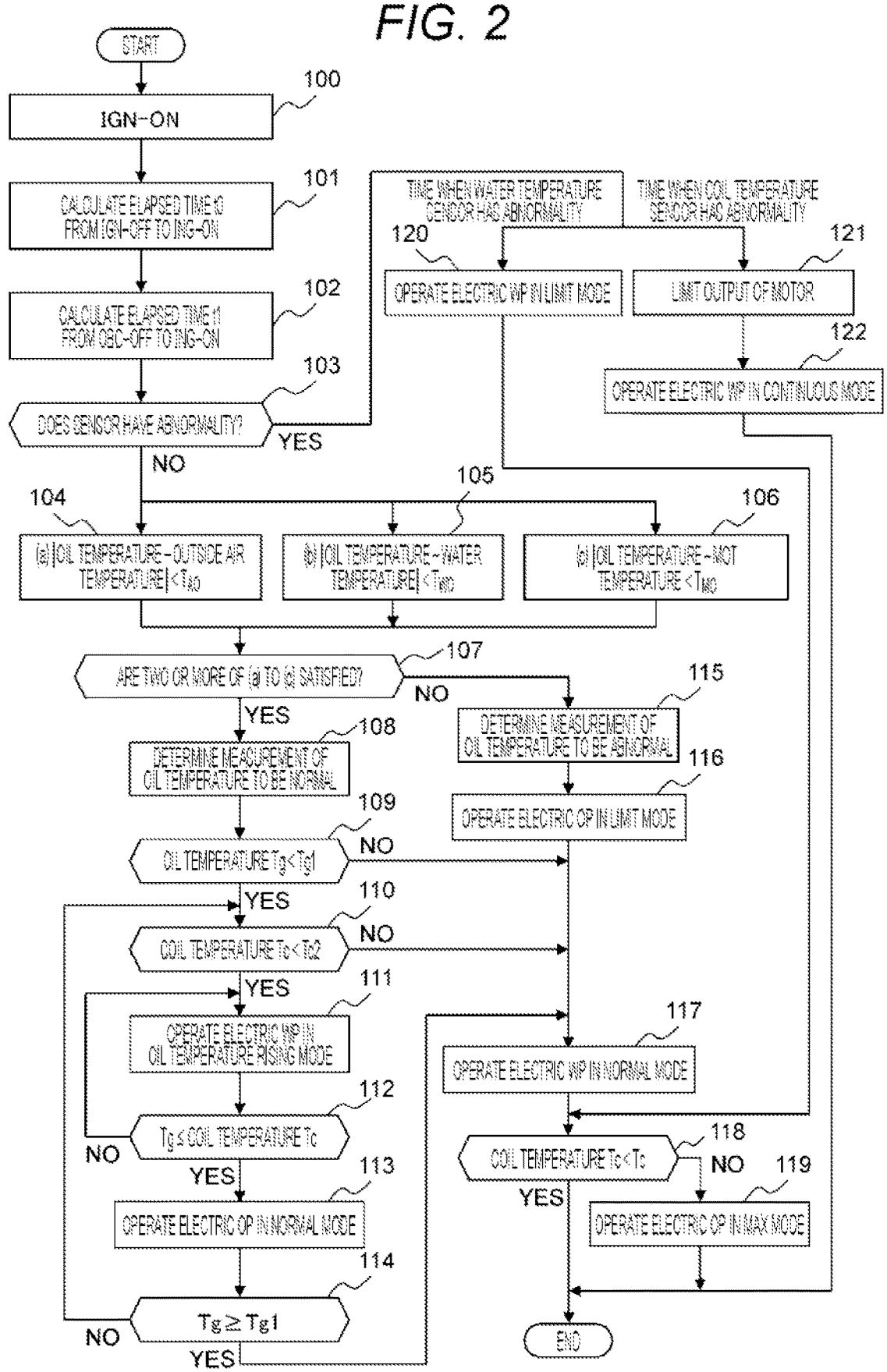
FIG. 2 is a flowchart of an operation of the cooling control device according to the embodiment of the present invention.

FIG. 2 is a flowchart of an operation of the cooling control device in the embodiment of the present invention.

The flowchart illustrated in FIG. 2 starts when an ignition switch of a vehicle is turned ON and power is supplied to the control device 50 (100).

First, the control device 50 calculates an elapsed time t0 from the ignition OFF to the ignition ON (101). Then, an elapsed time t1 from OFF of a charging circuit of the main machine battery to the ignition ON is calculated (102). Therefore, the charging circuit generates heat during charging of the main machine battery, and the cooling water is heated when the charging circuit is water-cooled. If the elapsed time t1 is short, the increased water temperature is not sufficiently decreased, the difference between the water temperature and the oil temperature increases. Thus, a condition (b) is not established in Step 105 described later, and the probability of the recognition abnormality increases. Therefore, in Step 102, when the elapsed time t1 is shorter than a predetermined threshold value, $T_{WO}$ which is a determination threshold value in Step 105 is preferably increased.

Then, the control device 50 determines whether there is an abnormality in the temperature sensors 13, 22, 43, and 52 (103). The abnormality of the temperature sensor can be determined based on determination whether the current flowing through the temperature sensor is in a normal range, determination whether the output value of the temperature sensor is in a normal range, a health check command, or the like.

Then, if the temperature sensor 43 is abnormal, it is not possible to measure the water temperature. Thus, the control device 50 operates the water pump 42 in a limit mode (120) and ends the processing. In the limit mode of the water pump 42, as illustrated in FIG. 3, the water pump 42 is operated at the minimum value of the maximum rated output within a use temperature range.

In addition, if the temperature sensor 22 is abnormal, it is not possible to measure the temperature of the winding of the rotating electrical machine 21. Thus, the control device 50 limits the output of the rotating electrical machine 21 (121), operates the water pump 42 in a continuous mode (122), and ends the processing. In the continuous mode of the water pump 42, as illustrated in FIG. 3, the water pump 42 is operated at the continuous rated output. The line of the continuous mode illustrated in FIG. 3 indicates a logical value at which cooling is possible when the water pump 42 is operated at the continuous rated output.

On the other hand, if the temperature sensor is normal, it is determined whether the measured value of the temperature sensor satisfies three conditions (a) to (c) (104 to 106).

In Step 104, (a) the control device 50 determines whether the absolute value of a difference between the oil temperature measured by the temperature sensor 13 and the outside air temperature measured by the temperature sensor 52 is smaller than a threshold value $T_{AO}$. In Step 105, (b) the control device 50 determines whether the absolute value of a difference between the oil temperature measured by the temperature sensor 13 and the water temperature measured by the temperature sensor 43 is smaller than a threshold value $T_{WO}$. In Step 106, (c) the control device 50 determines whether the absolute value of a difference between the oil temperature measured by the temperature sensor 13 and the winding temperature measured by the temperature sensor 22 is smaller than the threshold value $T_{MO}$.

The threshold value $T_{AO}$, the threshold value $T_{WO}$, and the threshold value $T_{MO}$ are values that change with the elapsed time t0 from the ignition OFF to the ignition ON, and is preferably defined by a function of t0. In addition, each threshold value may be determined based on a table from which each threshold value can be derived from t0. In addition to the elapsed time t0, the threshold value $T_{WO}$ is preferably changed with an elapsed time t1 from the charging circuit OFF to the ignition ON, and is preferably defined by a function of t0 and t1. In addition, the threshold value $T_{WO}$ may be determined based on a table from which the threshold value $T_{WO}$ can be derived from t0 and t1. The threshold values may be determined based on the temperature difference during running and the heat capacity of the measurement target (refrigerant or motor).

Then, the control device 50 determines whether two or more of the conditions (a) to (c) are satisfied (107). As a result, if two or more of the conditions (a) to (c) are satisfied, the control device 50 determines that the measured value of the oil temperature is normal (108), and executes the processing of Step 109 and the subsequent steps. On the other hand, if two or more of the conditions (a) to (c) are not satisfied, the control device 50 determines that the measured value of the oil temperature is abnormal (115), and executes the processing of Step 116 and the subsequent steps.

If a predetermined time has elapsed after the stop of the vehicle, the oil temperature, the water temperature, and the winding temperature converge to the same values as the outside air temperature. Therefore, the oil temperature is compared with a plurality of temperatures (outside air temperature, water temperature, and winding temperature) other than the oil temperature under the above conditions, and, when the difference is smaller than the predetermined threshold value, it can be determined that the oil temperature is normally measured.

The measured value of the oil temperature may be verified by using, as a condition (d) different from the conditions (a) to (c) described above, a case where a difference between the temperature of the inverter 60 and the oil temperature of the lubricating oil is smaller than a predetermined threshold value.

In Step 109 after the oil temperature measurement is determined to be normal, the control device 50 determines whether the oil temperature Tg measured by the temperature sensor 13 is lower than a threshold value Tg1 (109). If the oil temperature Tg measured by the temperature sensor 13 is equal to or higher than the threshold value Tg1, the oil temperature Tg is high, and thus, the water pump 42 is operated in a normal mode, and the lubricating oil is cooled with the cooling water (117). In the normal mode of the water pump 42, as illustrated in FIG. 3, the water pump 42 is operated at the rated output for a short time. The line of the normal mode illustrated in FIG. 3 indicates a logical value at which cooling is possible when the water pump 42 is operated at the rated output for the short time.

On the other hand, if the oil temperature Tg measured by the temperature sensor 13 is lower than the threshold value Tg1, the lubricating oil is sufficiently cooled. Thus, the control device 50 determines whether the winding temperature Tc measured by the temperature sensor 22 is lower than a threshold value Tc2 (110). If the winding temperature Tc is equal to or higher than the threshold value Tc2, the control device 50 operates the water pump 42 in the normal mode and cools the lubricating oil with the cooling water (117). On the other hand, if the winding temperature Tc is lower than the threshold value Tc2, the control device 50 operates the water pump 42 in an oil temperature rising mode to increase the oil temperature (111). In the oil temperature rising mode of the water pump 42, as illustrated in FIG. 3, when the water temperature is low and a large amount of heat is taken from the lubricating oil, the flow rate of the cooling water by the water pump 42 is lowered to increase the oil temperature up to an appropriate temperature.

Then, the control device 50 determines whether the oil temperature Tg measured by the temperature sensor 13 is equal to or lower than the winding temperature Tc (112). As a result, if the oil temperature Tg is higher than the winding temperature Tc, the process returns to Step 111 to continue the oil temperature rising mode. On the other hand, if the oil temperature Tg is equal to or lower than the winding temperature Tc, the control device 50 operates the oil pump 12 in the normal mode and cools the rotating electrical machine 21 with the lubricating oil (113). In the normal mode of the oil pump 12, as illustrated in FIG. 4, the oil pump 12 is operated only when the oil temperature is extremely low, and the oil pump 12 is stopped in other temperature ranges.

Then, the control device 50 determines whether the oil temperature Tg measured by the temperature sensor 13 is equal to or higher than the threshold value Tg1 (114). As a result, if the oil temperature Tg is lower than the threshold value Tg1, the process returns to Step 110 to determine whether the winding temperature Tc is lower than the threshold value Tc2. On the other hand, if the oil temperature Tg is equal to or higher than the threshold value Tg1, the water pump 42 is operated in the normal mode and the lubricating oil is cooled with the cooling water (117).

After Step 117, the control device 50 determines whether the winding temperature Tc is lower than a coil upper limit temperature Ts (118). As a result, if the winding temperature Tc is equal to or higher than the coil upper limit temperature Ts, it is necessary to rapidly cool the winding. Thus, the control device 50 operates the oil pump 12 in the maximum mode and maximally cools the rotating electrical machine 21 with the lubricating oil (119), and ends the processing. On the other hand, if the winding temperature Tc is lower than the coil upper limit temperature Ts, the processing is ended.

If it is determined that two or more of the conditions (a) to (c) are not satisfied and the measured value of the oil temperature is abnormal, in Step 116, the control device 50 operates the oil pump 12 in the limit mode and weakly cools the rotating electrical machine 21 with the lubricating oil (116). Then, the control device 50 operates the water pump 42 in the normal mode and cools the lubricating oil with the cooling water (117). In the limit mode of the oil pump 12, as illustrated in FIG. 4, the oil pump 12 is operated at the minimum value of the maximum rated output within a use temperature range.

As described above, the cooling control device 50 in the embodiment of the present invention verifies second temperature information (oil temperature) by using first temperature information (water temperature of the cooling water) of a first refrigerant that exchanges heat with at least the rotating electrical machine 21, the second temperature information (oil temperature of the lubricating oil) of a second refrigerant that exchanges heat with at least the winding of the rotating electrical machine 21 and is cooled by the first refrigerant, third temperature information (temperature of the rotating electrical machine 21), and fourth temperature information (temperature of the outside air). Thus, it is possible to avoid erroneous recognition of the oil temperature and appropriately control the cooling performance of the electric component. That is, even when the oil temperature recognition abnormality in which the temperature sensor 13 outputs a temperature lower than the actual oil temperature occurs, it is possible to maintain the minimum required vehicle traveling performance while maintaining the water cooling performance, and it is possible to avoid overheating of the rotating electrical machine 21 and the inverter 60.

In addition, since the second temperature information (oil temperature) is verified based on a first temperature parameter calculated by using the second temperature information (oil temperature) and the fourth temperature information (outside air temperature), a second temperature parameter calculated by using the second temperature information (oil temperature) and the first temperature information (cooling water temperature), and a third temperature parameter calculated by using the second temperature information (oil temperature) and the third temperature information (winding temperature), it is possible to accurately detect erroneous recognition of the oil temperature and appropriately control the cooling performance of the electric component.

In addition, the first temperature parameter (condition (a)) indicating the comparison result between the difference between the second temperature information (oil temperature) and the fourth temperature information (outside air temperature) and the threshold value $T_{AO}$, the second temperature parameter (condition (b)) indicating the comparison result between the difference between the second temperature information (oil temperature) and the first temperature information (cooling water temperature) and the threshold value $T_{WO}$, and the third temperature parameter (condition (c)) indicating the comparison result between the difference between the second temperature information (oil temperature) and the third temperature information (winding temperature) and the threshold value $T_{MO}$ are calculated. When at least two of the calculated first temperature parameter, second temperature parameter, and third temperature parameter satisfy a predetermined condition, it is determined that the second temperature information is normal. Thus, by determination based on a majority decision using the outside air temperature, the cooling water temperature, and the winding temperature as comparison targets, it is possible to correctly determine the erroneous recognition of the oil temperature.

In addition, since the threshold value $T_{AO}$, the threshold value $T_{WO}$, and the threshold value $T_{MO}$ are changed based on the elapsed time t0 from the stop to the restart of the control device 50, it is possible to set the threshold values in consideration of the temperature decrease of the cooling water or the lubricating oil during the stop of the vehicle, and it is possible to accurately detect the erroneous recognition of the oil temperature.

In addition, the first refrigerant (cooling water) cools the charging circuit that charges the battery that supplies electric power to the rotating electrical machine 21, and the threshold value $T_{WO}$ is changed based on the elapsed time t1 from the stop of the charging circuit to the start of the control device 50. Thus, it is possible to set the threshold values in consideration of the heating of the cooling water based on the operation of the charging circuit, and it is possible to accurately detect the erroneous recognition of the oil temperature.

In addition, the rotating electrical machine 21 and the inverter 60 are configured in one case 10, and a second temperature detection unit (temperature sensor 13) and a rotating electrical machine temperature detection unit (temperature sensor 22) are disposed in the case 10. Thus, the temperature sensor 13 is susceptible to noise, and it is possible to detect the erroneous recognition of the oil temperature due to the influence of noise from the inverter 60, which is included in the oil temperature measured by the temperature sensor 13.

In addition, since a first temperature detection unit (temperature sensor 43) is disposed outside the case 10, it is possible to accurately detect the erroneous recognition of the oil temperature by using the cooling water temperature measured by the temperature sensor 43 which is less influenced by noise from the inverter 60.

The present invention is not limited to the above-described embodiments, and includes various modifications and equivalent configurations within the spirit of the appended claims. For example, the above embodiments are described in detail in order to explain the present invention in an easy-to-understand manner, and the present invention is not necessarily limited to a case including all the described configurations. In addition, a portion of the configuration of one embodiment may be replaced with the configuration of another embodiment. Further, the configuration of one embodiment may be added to the configuration of another embodiment. Regarding some components in the embodiments, other components may be added, deleted, and replaced.

In addition, some or all of the above-described configurations, functions, processing units, processing means, and the like may be realized by hardware by, for example, designing with an integrated circuit, or may be realized by software by a processor interpreting and executing a program for realizing each function.

Information such as a program, a table, and a file, that realizes each function can be stored in a memory, a storage device such as a hard disk and a solid state drive (SSD), or a recording medium such as an IC card, an SD card, a DVD, and a BD.

Control lines and information lines considered necessary for the descriptions are illustrated, and not all the control lines and the information lines in mounting are necessarily shown. In practice, it may be considered that almost all components are connected to each other.

REFERENCE SIGNS LIST 10 case
11 gear box
12 oil pump
13 temperature sensor
21 rotating electrical machine
22 temperature sensor
23 water passage
30 lubricating oil pipe
40 cooling water pipe
41 radiator
42 water pump
43 temperature sensor
50 control device
52 temperature sensor
60 inverter

The invention claimed is:

1. A control device that controls cooling of a rotating electrical machine for driving a vehicle, the control device comprising:
an arithmetic operation unit that executes predetermined arithmetic operation processing; and
a storage unit that is accessible by the arithmetic operation unit,
wherein
first temperature information obtained by a first temperature detection unit that detects a temperature of a first refrigerant that exchanges heat with at least the rotating electrical machine, second temperature information obtained by a second temperature detection unit that detects a temperature of a second refrigerant that exchanges heat with at least a winding of the rotating electrical machine and is cooled by the first refrigerant, third temperature information obtained by a rotating electrical machine temperature detection unit that detects a temperature of the rotating electrical machine, and fourth temperature information obtained by an outside air temperature detection unit that detects a temperature of an outside air are input,
the second temperature information is verified by using the first temperature information, the second temperature information, the third temperature information, and the fourth temperature information,
the second temperature information is verified based on a first temperature parameter calculated by using the second temperature information and the fourth temperature information, a second temperature parameter calculated by using the second temperature information and the first temperature information, and a third temperature parameter calculated by using the second temperature information and the third temperature information,
the first temperature parameter indicating a comparison result between a predetermined threshold value and a difference between the second temperature information and the fourth temperature information, the second temperature parameter indicating a comparison result between a predetermined threshold value and a difference between the second temperature information and the first temperature information, and the third temperature parameter indicating a comparison result between a predetermined threshold value and a difference between the second temperature information and the third temperature information are calculated, and
when at least two of the calculated first temperature parameter, second temperature parameter, and third temperature parameter satisfy a predetermined condition, the second temperature information is determined to be normal.

2. The control device according to claim 1, wherein the predetermined threshold value is changed based on an elapsed time from stop to restart of the control device.

3. The control device according to claim 1, wherein
the first refrigerant cools a charging circuit that charges a battery that supplies electric power to the rotating electrical machine, and
the predetermined threshold value to be compared with the difference between the second temperature information and the first temperature information is changed based on an elapsed time from stop of the charging circuit to start of the control device.

4. The control device according to claim 1, wherein
a power conversion circuit unit that supplies electric power to the rotating electrical machine and the rotating electrical machine are configured in one case, and
the second temperature detection unit and the rotating electrical machine temperature detection unit are disposed in the case.

5. The control device according to claim 4, wherein the first temperature detection unit is disposed outside the case.

6. An electric system comprising:
the control device according to claim 1;
the rotating electrical machine; and
a power conversion circuit unit that supplies electric power to the rotating electrical machine.

7. The electric system according to claim 6, wherein
the rotating electrical machine and the power conversion circuit unit are configured in one case, and
the second temperature detection unit and the rotating electrical machine temperature detection unit are disposed in the case.

8. The electric system according to claim 7, wherein the first temperature detection unit is disposed outside the case.

9. A cooling control method executed by a control device that controls cooling of a rotating electrical machine for driving a vehicle, the control device including
an arithmetic operation unit that executes predetermined arithmetic operation processing, and
a storage unit that is accessible by the arithmetic operation unit,
the cooling control method comprising: by the arithmetic operation unit,
receiving first temperature information obtained by a first temperature detection unit that detects a temperature of a first refrigerant that exchanges heat with at least the rotating electrical machine;
receiving second temperature information obtained by a second temperature detection unit that detects a temperature of a second refrigerant that exchanges heat with at least a winding of the rotating electrical machine and is cooled by the first refrigerant;
receiving third temperature information obtained by a rotating electrical machine temperature detection unit that detects a temperature of the rotating electrical machine;
receiving fourth temperature information obtained by an outside air temperature detection unit that detects a temperature of an outside air;
verifying the second temperature information by using the first temperature information, the second temperature information, the third temperature information, and the fourth temperature information;
verifying the second temperature information based on:
a first temperature parameter calculated using the second temperature information and the fourth temperature information,
a second temperature parameter calculated by using the second temperature information and the first temperature information, and
a third temperature parameter calculated by using the second temperature information and the third temperature information;
calculating a first temperature parameter indicating a comparison result between a predetermined threshold value and a difference between the second temperature information and the fourth temperature information;
calculating a second temperature parameter indicating a comparison result between a predetermined threshold value and a difference between the second temperature information and the fourth temperature information;
calculating a third temperature parameter indicating a comparison result between a predetermined threshold value and a difference between the second temperature information and the third temperature information; and
determining that the second temperature information is normal when at least two of the first temperature parameter, second temperature parameter, and third temperature parameter satisfy a predetermined condition.

* * * * *